(12) United States Patent
Miller et al.

(10) Patent No.: US 6,464,330 B1
(45) Date of Patent: Oct. 15, 2002

(54) INK JET PRINTER WITH IMPROVED DRY TIME

(75) Inventors: Rodney L. Miller, Fairport; James S. Newkirk, LeRoy, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/939,936

(22) Filed: Aug. 27, 2001

(51) Int. Cl.[7] .............................. B41J 2/145; B41J 2/15
(52) U.S. Cl. ........................................................ 347/40
(58) Field of Search .............................. 347/40, 15, 41, 347/19

(56) References Cited

U.S. PATENT DOCUMENTS

| | | |
|---|---|---|
| 4,746,935 A | 5/1988 | Allen |
| 4,967,203 A | 10/1990 | Doan et al. |
| 5,416,612 A | 5/1995 | Ingraham et al. |
| 5,992,962 A | 11/1999 | Yen et al. |
| 6,158,841 A * | 12/2000 | Kabutani ...................... 347/40 |
| 6,217,149 B1 * | 4/2001 | Takagi et al. .................. 347/41 |

OTHER PUBLICATIONS

US 09/940,224, filed Aug. 27, 2001, Ink Cartridge, R. Winfield Trafton, et al.
US 09/940,195, filed Aug. 27, 2001, Ink Cartridge with Ink Color Discrimination Structure, R. Winfield Trafton, et al.

* cited by examiner

Primary Examiner—Thinh Nguyen
(74) Attorney, Agent, or Firm—Norman Rushefsky

(57) ABSTRACT

An ink jet print head includes an array of nozzles, each nozzle being capable of selectively producing when actuated at least two ink drop sizes including a larger ink drop size and a smaller ink drop size. In response to a pixel density signal of maximum density value at a respective pixel location, a nozzle prints a drop of the larger ink drop size at the respective pixel location on a reference raster and the same or a different nozzle prints a drop of a smaller drop size at a pixel location adjacent to the respective pixel location on a shifted raster to provide for full coverage with improved dry time capability of the printed ink drops.

25 Claims, 11 Drawing Sheets

REFERENCE RASTER PASS TABLE

| MULTI-TONE LEVEL | DROP VOLUME INDEX |
|---|---|
| 0 | A |
| 1 | C |
| 2 | E |
| 3 | F |

FIG. 10(a)

SHIFTED RASTER PASS TABLE

| MULTI-TONE LEVEL | DROP VOLUME INDEX |
|---|---|
| 0 | A |
| 1 | A |
| 2 | A |
| 3 | B |

FIG. 10(b)

SHIFTED RASTER LUT

| PRINT PASS | SHIFT INDICATOR |
|---|---|
| 0 | F |
| 1 | T |
| 2 | F |
| 3 | T |

FIG. 10(c)

PRINT MASK

| 0 | 1 |
|---|---|
| 1 | 0 |

FIG. 10(d)

DROP VOLUME LUT

| DROP VOLUME INDEX | DROP VOLUME |
|---|---|
| A | 0 |
| B | 8PL |
| C | 16PL |
| D | 32PL |
| E | 48PL |
| F | 64PL |

FIG. 10(e)

REFERENCE RASTER PASS TABLE

| MULTI-TONE LEVEL | DROP VOLUME INDEX |
|---|---|
| 0 | A |
| 1 | B |
| 2 | C |
| 3 | C |
| 4 | D |
| 5 | D |
| 6 | E |
| 7 | E |
| 8 | F |
| 9 | F |
| 10 | F |
| 11 | A |
| 12 | A |
| 13 | A |
| 14 | A |
| 15 | A |

*FIG. 12(a)*

SHIFTED RASTER PASS TABLE

| MULTI-TONE LEVEL | DROP VOLUME INDEX |
|---|---|
| 0 | A |
| 1 | A |
| 2 | A |
| 3 | B |
| 4 | A |
| 5 | B |
| 6 | A |
| 7 | B |
| 8 | A |
| 9 | B |
| 10 | C |
| 11 | A |
| 12 | A |
| 13 | A |
| 14 | A |
| 15 | A |

*FIG. 12(b)*

SHIFTED RASTER LUT

| PRINT PASS | SHIFT INDICATOR |
|---|---|
| 0 | F |
| 1 | T |
| 2 | F |
| 3 | T |
| 4 | F |
| 5 | T |
| 6 | F |
| 7 | T |

*FIG. 12(c)*

PRINT MASK

| | | | |
|---|---|---|---|
| 0 | 1 | 0 | 1 |
| 1 | 0 | 1 | 0 |
| 0 | 1 | 0 | 1 |
| 1 | 0 | 1 | 0 |

*FIG. 12(d)*

DROP VOLUME LUT

| DROP VOLUME INDEX | DROP VOLUME |
|---|---|
| A | 0 |
| B | 8PL |
| C | 16PL |
| D | 32PL |
| E | 48PL |
| F | 64PL |

*FIG. 12(e)*

REFERENCE RASTER
PASS TABLE

| MULTI-TONE LEVEL | DROP VOLUME INDEX |
|---|---|
| 0 | A |
| 1 | B |
| 2 | C |
| 3 | D |
| 4 | E |
| 5 | F |
| 6 | F |
| 7 | A |
| 8 | A |
| 9 | A |
| 10 | A |
| 11 | A |
| 12 | A |
| 13 | A |
| 14 | A |
| 15 | A |

FIG. 13(a)

SHIFTED RASTER
PASS TABLE

| MULTI-TONE LEVEL | DROP VOLUME INDEX |
|---|---|
| 0 | A |
| 1 | A |
| 2 | A |
| 3 | A |
| 4 | A |
| 5 | A |
| 6 | B |
| 7 | A |
| 8 | A |
| 9 | A |
| 10 | A |
| 11 | A |
| 12 | A |
| 13 | A |
| 14 | A |
| 15 | A |

FIG. 13(b)

SHIFTED RASTER LUT

| PRINT PASS | SHIFT INDICATOR |
|---|---|
| 0 | F |
| 1 | T |
| 2 | F |
| 3 | T |

FIG. 13(c)

PRINT MASK

| 0 | 1 |
|---|---|
| 1 | 0 |

FIG. 13(d)

DROP VOLUME LUT

| DROP VOLUME INDEX | DROP VOLUME |
|---|---|
| A | 0 |
| B | 8PL |
| C | 16PL |
| D | 32PL |
| E | 48PL |
| F | 64PL |

FIG. 13(e)

INK JET PRINTER WITH IMPROVED DRY TIME

CROSS REFERENCE TO RELATED APPLICATIONS

This application is related to the following U.S. patent applications filed on even date herewith:

U.S. application Ser. No. 09/940,224 filed in the names of James Newkirk et al and entitled "METHOD AND APPARATUS FOR INCREASING NUMBER OF AVAILABLE PRINTING GRADATIONS ON AN INK JET PRINTER;" and U.S. application Ser. No. 09/940,195 filed in the names of Rodney L. Miller et al. and entitled "METHOD AND APPARATUS OF OPTIMIZING DISCRETE DROP VOLUMES FOR MULTIDROP CAPABLE INKJET PRINTERS."

FIELD OF THE INVENTION

The invention relates generally to the field of ink jet printing and more particularly to ink jet printing with a print head capable of depositing multiple drop sizes.

BACKGROUND OF THE INVENTION

Ink jet printing is a non-impact method for producing images by the deposition of ink droplets in a pixel-by-pixel manner onto an image recording element in response to digital signals. There are various methods which may be utilized to control the deposition of ink droplets on the recording element to yield the desired image. In one process, known as drop-on-demand ink jet printing, individual ink droplets are projected as needed onto the recording element to form the desired image. Common methods of controlling the projection of ink droplets in drop-on-demand printing include piezoelectric transducers and thermal bubble formation using heat actuators. With regard to heat actuators, a heater placed at a convenient location within the nozzle or at the nozzle opening heats the ink in selected nozzles and causes a drop to be ejected to the recording medium in those nozzles selected in accordance with image data. With respect to piezoelectro-actuators, piezoelectric material is used which piezoelectric material possesses the property such that when electrical field is applied to the material a mechanical stresse is induced therein reducing the volume of the nozzle and causing a drop to be selectively ejected from the nozzle selected. The image data applied to the print head determines which of the nozzles are selected for ejection of a respective drop from each nozzle at a particular pixel location on a receiver sheet. Some drop-on-demand ink jet printers described in the patent literature use both piezoelectric actuators and heat actuators.

In another process, known as continuous ink jet printing, a continuous stream of droplets is charged and deflected in an imagewise manner onto the surface of the recording element, while unimaged droplets are caught and returned to an ink sump. Ink jet printers have found broad applications across markets ranging from desktop document and pictorial imaging to short run printing and industrial labeling.

A typical ink jet printer reproduces an image by ejecting small drops of ink from a print head containing an array of spaced apart nozzles, where the ink drops land on a receiver medium (typically paper) to form round ink dots. In some printers, all drops are the same size, and therefore, all dots are the same size. Normally, these drops are deposited with their respective dot centers on a rectilinear grid, a raster, with equal spacing, p, in the horizontal and vertical directions. Therefore, to achieve full coverage of the ink it is necessary for the dots, 10, to have at least diameter p*sqrt(2), as shown in FIG. 3. Some printer designs may allow for even bigger dots in order to compensate for unwanted variations in the placement of the drops.

Modem inkjet printers may also possess the ability to vary (over some range) the amount of ink that is deposited at a given location on the page. Ink jet printers with this capability are referred to as "multitone" or gray scale ink jet printers because they can produce multiple density tones at each pixel location on the page. Some multitone ink jet printers achieve this by varying the volume of the ink drop produced by the nozzle by changing the electrical signals sent to the nozzle or by varying the diameter of the nozzle. See for example U.S. Pat. No. 4,746,935. Other multitone ink jet printers produce a variable number of smaller, fixed size droplets that are ejected by the nozzle (or by plural nozzles during different passes of the nozzle array), all of which are intended to merge and land at the same pixel location on the page. See for example U.S. Pat. No. 5,416,612. These techniques allow the printer to vary the size or optical density of a given ink dot or pixel, which produces a range of density levels at each dot or pixel location, thereby improving the image quality. Thus printing methods that require multiple drop sizes usually depend upon the way the drops are generated by the print head. As noted above some print heads have multiple size nozzle diameters, others have circuitry in which the individual ink chambers acccept changing electrical signals to instruct each chamber how much ink to eject. Still other print heads have nozzles that eject a variable number of small, fixed size droplets that are intended to merge then land in a given image pixel location. Printing methods that deposit more than one drop in a pixel location are typically carried out by multiple printing passes wherein the print head prints a row of pixels pixels multiple times, the image data to the print head changing in accordance with each pass so that the correct number of total droplets deposited at any pixel location is commensurate with the density required by the processed image data.

The exact relationship between drop size and dot size depends on many factors. However, in many cases it can be approximated by the equation $$d = a * v^b, \quad \text{(Equ 1)}$$

where d is the diameter of the dot, v is the volume of the drop, a is a positive constant whose magnitude depends on the units of d and v, and b is a positive constant in the range 0.0 to 1.0. This means that the ratio of dot size to volume is given by $$d/v = a * v^{(b-1)}. \quad \text{(Equ 2)}$$

Therefore, as drop volume goes up the ratio of dot size to drop volume goes down, which generally means that increasing drop volume provides diminishing returns in terms of dot size.

Note, however, to achieve full coverage with a multitone ink jet printer it is still necessary that the largest dot have at least a diameter of p*sqrt(2), and that this largest drop be deposited at each addressable location on the raster.

The time required for an ink jet print to dry can be directly related to the volume of ink deposited on the media. The maximum volume of ink is determined by the dot size required to achieve full coverage. In the case of a binary or multitone printer writing on a raster the dot size per pixel required to achieve full coverage has already been shown in FIG. 3 to be one dot with diameter p*sqrt(2).

In the field of inkjet printing it is also well known that if ink drops placed at neighboring locations on the page are printed at the same time, then the ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. There are many techniques present in the prior art that describe methods of increasing the time delay between printing adjacent dots using methods referred to as "interlacing", "print masking", or "multipass printing". There are also techniques present in the prior art for reducing one-dimensional periodic artifacts or "bands." This is achieved by advancing the paper by an increment less than the printhead width, so that successive passes or swaths of the printhead overlap. The techniques of print masking and swath overlapping are typically combined. See, for example, U.S. Pat. No. 4,967,203 and 5,992,962. The term "print masking" generically means printing subsets of the image pixels in multiple passes of the printhead relative to a receiver medium.

There is a need for improvement over the prior art in ink jet printing to achieve full coverage with a minimum amount of ink so as to minimize the dry time required for an ink jet print. The prior art utilized large dots with excessive amounts of overlap in order to achieve full coverage. This invention provides a method for achieving full coverage with less dot overlap and with smaller drops, thereby achieving faster dry times.

SUMMARY OF THE INVENTION

An object of the present invention is to achieve full coverage with less total ink volume, thereby minimizing dry time. This invention relies on multitone printing capability in combination with a printer that can print on the shifted raster. As used herein a "shifted raster" implies a subsidiary grid of printing locations that provides dot or pixel locations that are not on the primary or reference raster and wherein spacing between pixel locations on the shifted raster and the reference raster pixel locations are always less than the nominal spacing between centers of recording elements on the printhead.

This invention provides a method of printing and a printer apparatus for reducing the dry time required for an inkjet print by reducing the amount of ink required to achieve full coverage. The method is implemented in the controller which prepares data for ink jet printing and in the controller which controls the positioning of the ink jet head and the position of the ink receiver, or media.

The invention and its objects and advantages are achieved in accordance with a first aspect of the invention by an ink jet printer, comprising an ink jet print head having an array of nozzles, each nozzle being capable of selectively producing when actuated at least two ink drop sizes including a larger ink drop size and a smaller ink drop size; and a controller providing, in response to each pixel density signal of maximum density value at a respective pixel location, a signal to a nozzle to print an ink drop of the larger ink drop size at the respective pixel location on a reference raster and a signal to a same or different nozzle to print an ink drop of the smaller ink drop size at a pixel location adjacent to the respective pixel location but on a shifted raster.

In accordance with a second aspect of the invention there is provided an ink jet printer, comprising an ink jet print head having an array of nozzles, each nozzle being capable of selectively producing when actuated an ink drop; and a controller responsive to a pixel density signal for controlling the print head for printing, in response to a signal calling for a maximum density value at a respective pixel location, a larger ink dot at the respective pixel location on a reference raster and a smaller ink dot at a pixel location adjacent to the respective pixel location but on a shifted raster and wherein the larger and smaller ink dots are of respective sizes such that for a 2×2 set or cluster of adjacent ink dots, each of the larger ink dot size and each at adjacent pixel locations of the reference raster, a gap is left in the center of the cluster, and the smaller ink dot on the shifted raster when in the center of the 2×2 set of adjacent larger ink dots is of a size to cover the gap.

In accordance with a third aspect of the invention there is provided an ink jet printer, comprising:

a) an ink jet print head having an array of nozzles arranged in at least one row, each nozzle being capable when actuated of selectively producing a larger drop or a smaller drop at a pixel location on a receiver medium;

b) an ink jet print head drive for moving the ink jet print head in a fast scan direction perpendicular to the row of nozzles;

c) a print media driver for moving the receiver medium past the print head in a slow scan direction orthogonal to the fast scan direction;

d) a controller for controlling the size of drops from the nozzles, the print head drive and the print media drive for depositing ink drops in a reference raster, whereby a 2×2 cluster of four adjacent large ink drops in the reference raster leaves a gap in the center of the cluster, and for depositing a smaller ink drop in a shifted raster in response to a print signal for printing a maximum density dot on the reference raster whereby the smaller ink drop covers the gap in the cluster.

In accordance with a fourth aspect of the invention there is provided a method of printing with an ink jet printer, comprising the steps of providing an ink jet print head having an array of nozzles, each nozzle being capable of selectively producing when actuated at least two ink drop sizes including a larger ink drop size and a smaller ink drop size; and in response to each pixel density signal of maximum density value at a respective pixel location on a receiver printing an ink drop of the larger ink drop size at the respective pixel location on a reference raster and printing an ink drop of the smaller ink drop size at a pixel location adjacent to the respective pixel location but on a shifted raster.

In accordance with a fifth aspect of the invention there is provided a method of printing with an ink jet printer, comprising the steps of providing an ink jet print head having an array of nozzles, each nozzle being capable of selectively producing when actuated an ink drop; and printing, in response to a signal calling for a maximum density value at a respective pixel location, a larger ink dot at the respective pixel location on a reference raster and a smaller ink dot at a pixel location adjacent to the respective pixel location but on a shifted raster and wherein the larger and smaller ink dots are of a respective size such that for a 2×2 set or cluster of adjacent ink dots each of the larger ink dot size and each on the adjacent pixel locations of the reference raster a gap is left in the center of the cluster, and the smaller ink dot on the shifted raster in the center of the 2×2 set of adjacent larger ink dots is of a size to cover the gap.

The invention is particularly suited for an ink jet printer that has a maximum dot size capability wherein a square of four pixels printed by the printer will not provide ink coverage for the center between the four pixels.

It will be shown that the combination of a drop with dot diameter less than p*sqrt(2) on the reference raster and a second drop with smaller diameter on the shifted raster can achieve full coverage with less total ink volume than either: a) a single drop with dot diameter p*sqrt(2) on the reference raster, or b) two drops each with dot diameter p, one each on the reference and shifted rasters.

BRIEF DESCRIPTION OF THE DRAWINGS

While the specification concludes with claims particularly pointing out and distinctly claiming the subject matter of the present invention, it is believed the invention will be better understood from the following detailed description when taken in conjunction with the accompanying drawings wherein:

FIGS. 10(a)–(e) are examples of a set of table values that would be provided from the main lookup tables selector of FIG. 8 in response to a job request

FIGS. 12(a)–(e) and FIGS. 13(a) and (e) are additional examples of sets of table values that are provided by the main lookup table selector in accordance with different respective job parameter requests.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1A:
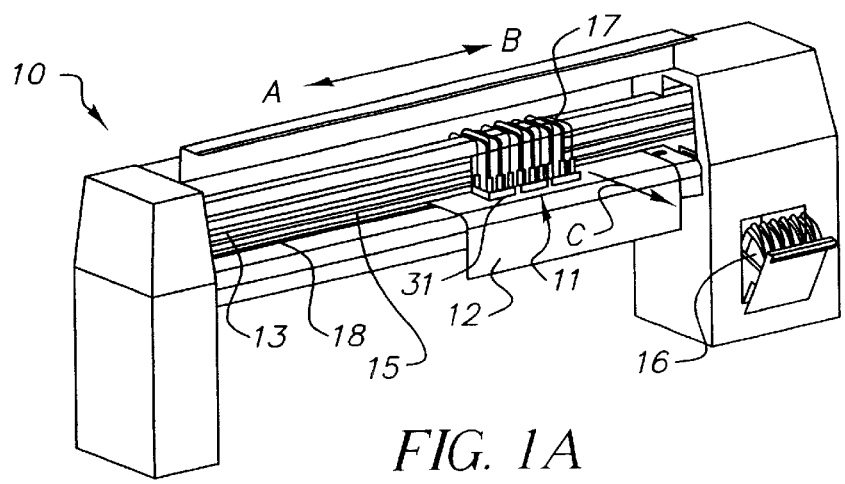
FIG. 1A is a schematical perspective view of a printer incorporating the invention.

With reference to FIG. 1A shows an embodiment of printer 10 which incorporates the invention herein. Reference 11 designates a carriage. An inkjet print head 31 faces the recording element and is mounted on the print head module 25 (FIG. 11B) which in turn is mounted on the carriage 11. The carriage 11, coupled through a timing belt 13 with a driver motor (not show), is reproducibly movable longer width of the recording element 12 (in the directions of the arrows A–B), while being guided by a guide member 15. The inkjet print head 31 receives ink from the ink tank 16 through ink supply tube 17. A transport roller 18, when driven by drive motor (not show), transports the recording medium 12 in the direction (arrow C) perpendicular to the moving direction of the carriage 11.

A raster image processor controls image manipulation and the resultant image file is delivered to the printer via a remotely located computer through a communications port. On board memory stores the image file while the printer is an operation.

Figure 1B:
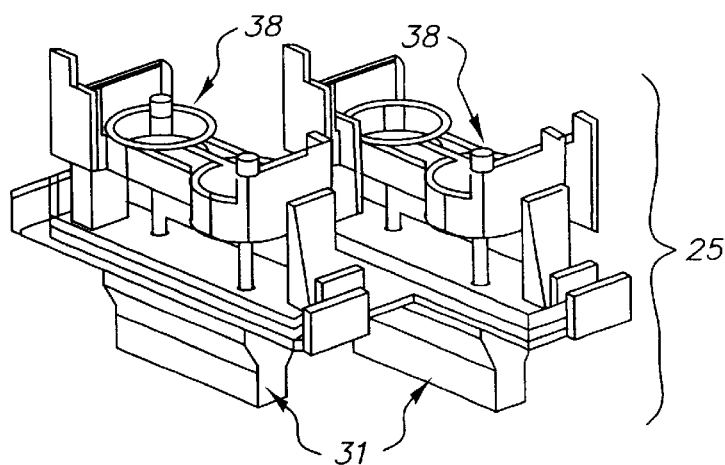
FIG. 1B is a perspective view of an ink jet print head module used as one of the print heads in the printer of FIG. 1A.
Figure 1C:
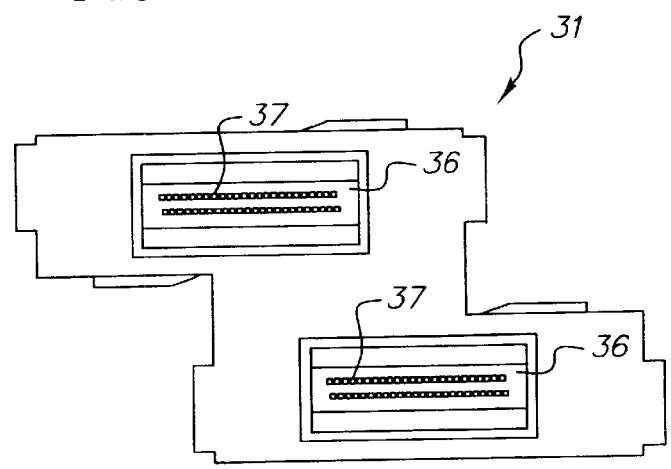
FIG. 1C is a view of the nozzle plates with nozzle openings for the print head module of FIG. 1B.

FIGS. 1B and 1C show an embodiment of a piezoelectric print head assembly 25. Reference number 36 designates a nozzle plate having nozzle openings 37 formed therein. An ink supply port 38 through which ink flows from the ink tank 16 be an ink supply tube 17. The firing rate of the print head 31 may be switched between 7.5 kHz and 15 kHz depending on the selection of image resolution and print quality. The carriage velocity is fixed in the printer described in all print modes, although such is not required in accordance with the invention. Although illustration is provided of a piezoelectric printhead the invention may be carried out with other printheads such as thermal and continuous inkjet printheads.

Figure 2:
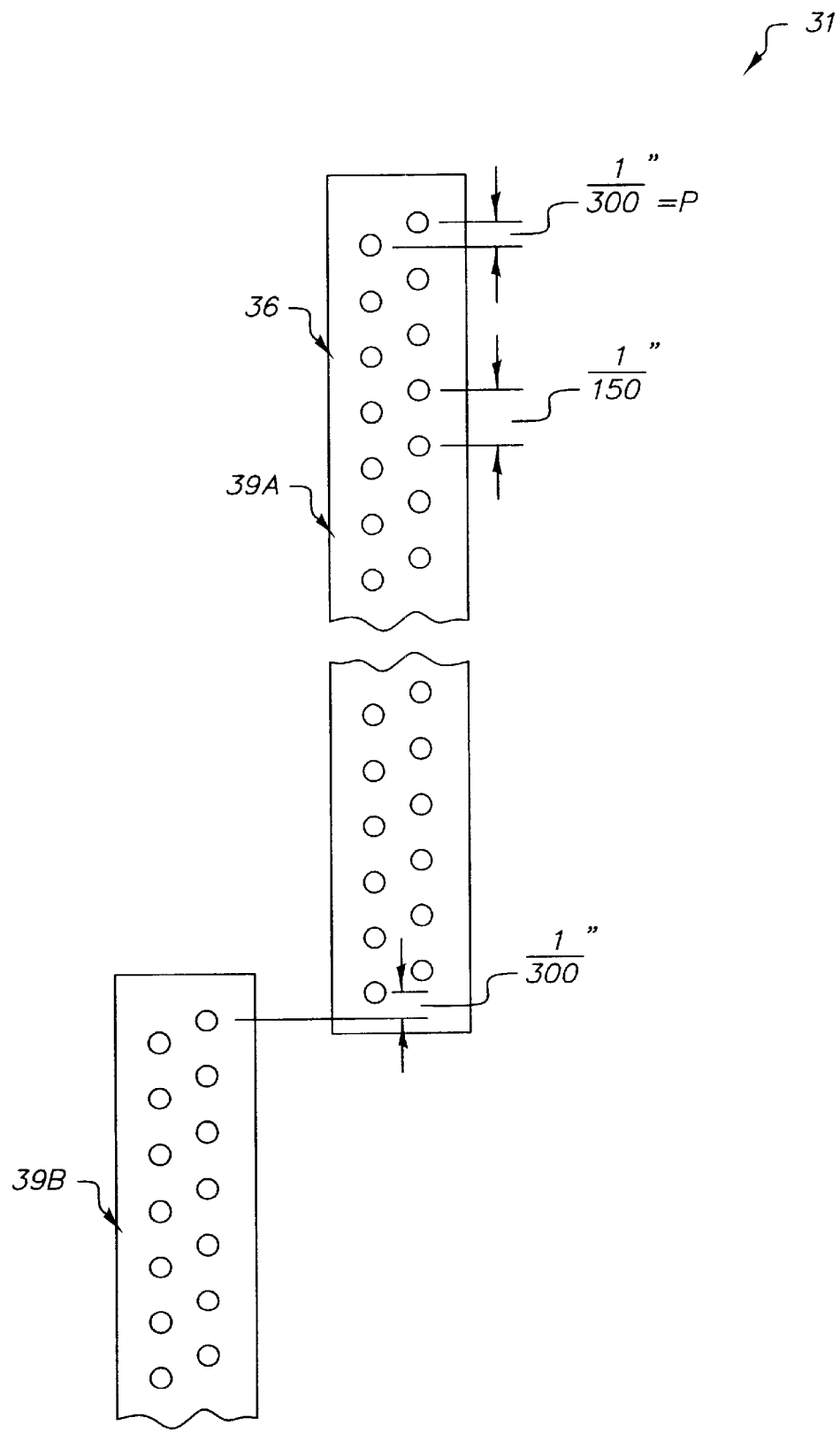
FIG. 2 is a schematic of the nozzle plate shown in FIG. 1C and illustrating an example of a staggered array of nozzle openings.

With reference to FIG. 2 the print head 31 for each color of ink to be printed includes in this embodiment two printhead segments 39A and 39B. Each printhead segment includes two staggered rows of nozzles and each row of nozzles has a spacing of 1/150 of an inch between adjacent nozzles in the row. However, due to the presence of staggering there is a nominal nozzle spacing on each printhead segment of 1/300 of an inch as indicated in the figure. The nozzles on the second segment are similar to that on the first segment and the segments are arranged to continue the nominal nozzle spacing for the printhead of 1/300 of an inch spacing between nozzles, this nominal nozzle spacing may be generally referred to as "p" when discussing raster grid spacings below. It will be understood that for a printer 10 having six different color inks, there will be six similar printheads similar to that described for print head 31. The six different color print heads arranged on the carriage 11 and as the carriage is traversed across the receiver sheet 12 for a print pass the nozzles in each of the six color print heads are actuated to print with ink in their respective colors in accordance with image instructions received from the RIP and as such instructions are modified in accordance with the teachings herein. Typically in printers of this type the number of nozzles provided is insufficient to print in entire image during a print pass and thus plural print passes are required to print an image with the receiver sheet being indexed in the direction of the arrow C after each pass. Thus, it may be said that the images are printed a swath at a time. However, a modification to this last statement exists for the situation wherein a printing technique known as "print masking" is used which will be explained below. Where print masking is used typically no indexing of the receiver sheet is done until the image that is to be printed in the swath is printed through multiple passes of the printhead for the reasons to be described below. In the following description it will be understood that a print pass may be accomplished also during a return movement of the nozzles to their starting positions. Another factor which will be introduced in the description herein for the printing of images a swath at a time is that of printing on the "shifted raster."

Thus, the ink jet printer configurations employed herein comprise an ink jet print head that have an array of nozzles. Each nozzle can eject drops independently, and each nozzle can eject at least three different volumes of ink including a drop of zero volume where essentially background is printed. The print head may be a drop on demand or continuous ink jet printing device. An ink jet print head drive mechanism moves the print head in a direction generally perpendicular to the array of nozzles. This direction is referred to as the fast scan direction. Mechanisms for moving the print head in this direction are well known and usually comprise providing the support of the print head or carriage on rails, which may include a rail that has a screw thread, and advancing the print head along the rails, such as by rotating the rail with the screw thread or otherwise advancing the print head along the rails such as by using a timing belt and carriage. Such mechanisms typically provide a back and forth movement to the printhead. Information to the printhead, including data and control signals, can be delivered through a flexible band of wires or electro-optical link. As the print head is transported in the fast scan direction, the nozzles selectively eject drops at intervals in accordance with enabling signals from a controller that is responsive to image data input into the printer. The intervals in combination with the nozzle spacing represent an addressable rectilinear grid, a raster, on which drops are placed. A pass of the head during which drops are ejected is known as a print pass. The drops ejected during a print pass land on an ink jet medium. After one or more print passes, a print media drive moves the ink jet print medium; i.e. a receiver sheet such as paper, coated paper or plastic or a plate from which prints can be made, past the print head in a slow scan direction orthogonal or transverse to the fast scan direction. After the print medium or receiver member has been advanced, the print head executes another set of one or more print passes. Printing during a next pass may be while the print head is moving in the reverse direction to that moved during the prior pass. The receiver member may a discrete sheet driven by a roller or other known driving device or the receiver sheet may be a continuous sheet driven, typically intermittently, by a drive to a take-up roller or to a feed roller drive.

Figure 5A:
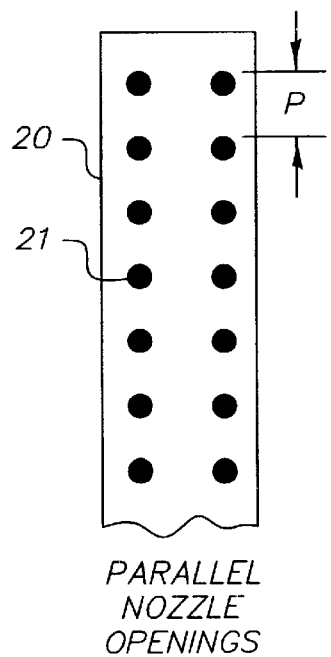
FIG. 5A is an illustration of an alternative nozzle plate which may be used using non-staggered nozzle openings and illustrating plural rows of nozzles, it being understood that a further nozzle design which may be used comprises only a single row of nozzles.
Figure 5B:
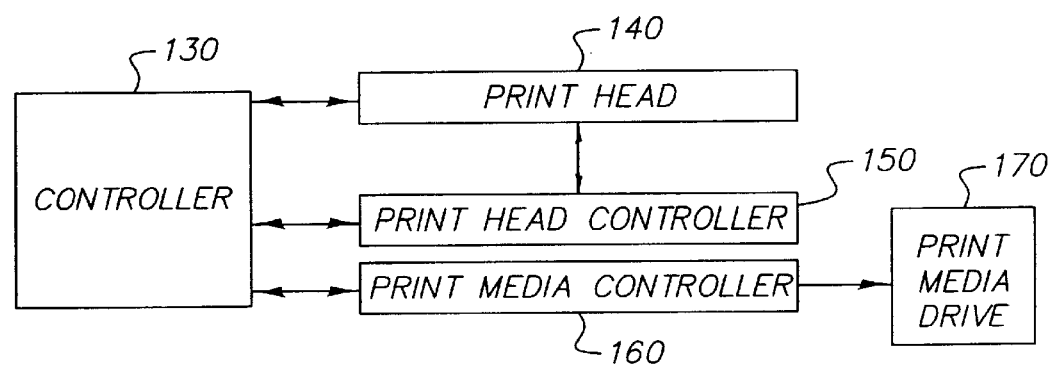
FIG. 5B is a schematic of a control system for the printer of FIG. 1.

Printheads are also known with one or two parallel rows of nozzles that are not staggered thus allowing printing of at least certain pixels using drops output by two nozzles in succession (see in this regard to FIG. 5A).

Before a print pass, the print medium is lined up with the nozzle array such that the nozzles will eject drops during a print pass onto the raster known as the reference raster. During a subsequent print pass the print medium may be aligned with the nozzle array such that the nozzles will eject drops during a print pass onto the raster known as the shifted raster, in which the alignment is adjusted so that the shifted raster is shifted by one half pixel in the slow scan direction, this distance being one-half of the nominal spacing between nozzles on the printhead. It will be understood that while only a few nozzles are illustrated with a nominal nozzle spacing between nozzle centers of p that hundreds and even thousands of nozzles may be on a print head of certain nominal nozzle spacing of for example $1/300^{th}$ of an inch or $1/600^{th}$ of an inch between nozzle centers. During the print pass for the shifted raster the timing of the intervals is adjusted so that the shifted raster is also shifted by one half pixel in the fast scan direction from that of the reference raster.

A typical ink jet printer reproduces an image by ejecting small drops of ink from a print head containing an array of spaced apart nozzles, or the ink drops land on a receiver medium (typically paper) to form round ink dots. In some printers, all drops are the same size, and therefore, all dots are the same size. Normally, these drops are deposited with their respective dot centers on a rectilinear grid, a raster, with equal spacing,p, in the horizontal and vertical directions (see FIG. 3). Therefore, to achieve full coverage of the ink it is necessary for the dots, 10, to have at least diameter p*sqrt (2).

Modem ink jet printers may also possess the ability to vary (over some range) the amount of ink that is deposited at a given location on the page. Ink jet printers with this capability are referred to as "multitone" or gray scale or "multidrop capable" inkjet printers because they can produce multiple density tones at each pixel location on the page. Some multitone ink jet printers achieve this by varying the volume of the ink drop produced by the nozzle by changing the electrical signals sent to the nozzle by varying the diameter of the nozzle. See for example U.S. Pat. No. 4,746,935. Other multitone ink jet printers produce a variable number of smaller, fixed size droplets that are ejected by the nozzle (or by plural nozzles during different passes of the nozzle array), all of which are intended to merge and land at the same pixel location on the page.

See for example U.S. Pat. No. 5,416,612. These techniques allow the printed to vary the size or optical density of a given ink dot, which produces a range of density levels at each dot location, thereby improving the image quality. Thus printing methods that require multiple drops sizes usually depend upon the way the drops are generated by the print head. As noted above some printheads have multiple size nozzle diameters, others have circuitry in which the individual ink chambers accept changing electrical signals to instruct each chamber how much ink to eject. Still other printheads have nozzles that ejecting variable number of small, fixed size droplets that are intended to merge then land in a given image pixel location. Printing methods that deposit more than one drop in the pixel location are typically carried out by multiple printing passes wherein the printhead prints a row of pixels multiple times, the image data to the printhead changing in accordance with each pass so that the correct number of total droplets deposited at any pixel location is commensurate with the density required by the processed image data.

The exact relationship between drop size and dot size depends on many factors. However, as drop volume goes up the ratio of dot size to drop volume goes down, which generally means that increasing drop volume provides diminishing returns in terms of dot size.

Figure 3:
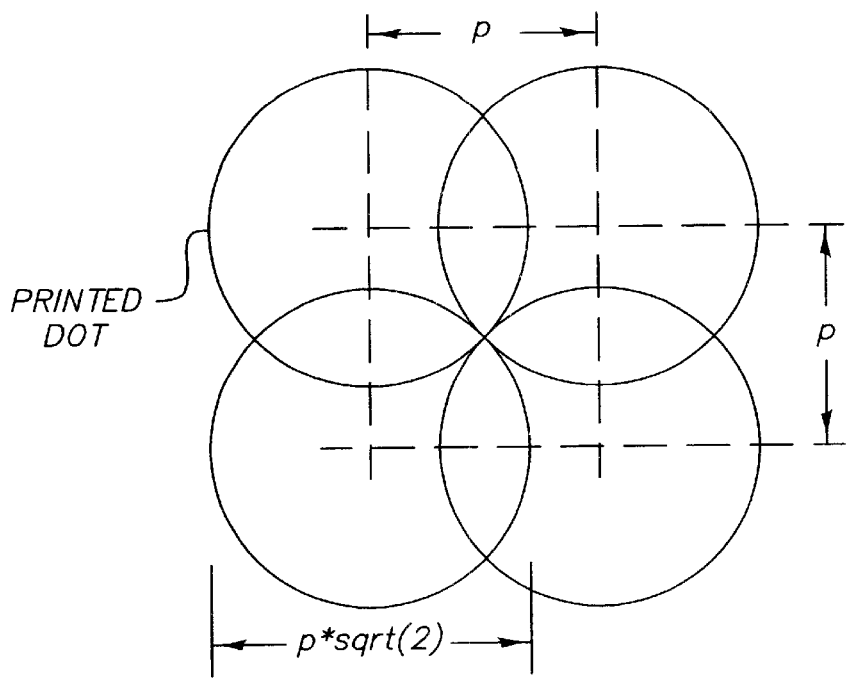
FIG. 3 is an example of a dot size required for full coverage when a 2×2 cluster of four dots are printed.

However, to achieve fill coverage with a multitone ink jet printer, it is still necessary that the largest dot have at least diameter of p*sqrt2 as illustrated in FIG. 3, and that this largest drop the deposited at each addressable location on the raster.

The time required for an ink jet print to dry can be directly related to the volume of ink deposited on the media. The maximum volume of ink is determined by the dot size required to achieve full coverage. In the case of a binary or multitone printer writing on a raster the dot size per pixel required to achieve fall coverage has been shown in FIG. 3 to be one dot with diameter p*sqrt2.

In the field of ink jet printing, it is also well known that if ink drops placed at neighboring locations on the page are printed at the same time, then ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. There are many techniques present in the prior art that described methods of increasing the time delay between printing adjacent dots using methods referred to as "interlacing", "print masking", or "multipass printing". There are also techniques present in the prior art for reducing one-dimensional periodic artifacts or "bands". This is achieved by advancing the paper by an increment less than the printhead width, so that successive passes or swaths of the printhead overlap. The technique of print masking and swath overlapping are typically combined. See, for example, U.S. Pat. Nos. 4,967,203 and 5,992,962. The term "print masking" generally means printing subsets of the image pixels and multiple passes of the printhead relative to a receiver medium as will be described below.

As will be noted below, an important feature of the invention relies on multitone printing capability with printing on the shifted raster. Although the invention is not limited to printers that can print on the shifted raster, there are various advantages that are obtained with printers with such capability. The use of printing on the shifted raster as well as the reference raster can provide full coverage using smaller size maximum drops and thereby enhance dry time of the printed dots reducing coalescence and saving ink. An additional advantages as will be shown herein and as also described in the cross-referenced application to Newkirk et al. is that greater multitone levels of printing can be obtained from a printer capable of printing only a relatively few number of different ink drop volumes.

Figure 4:
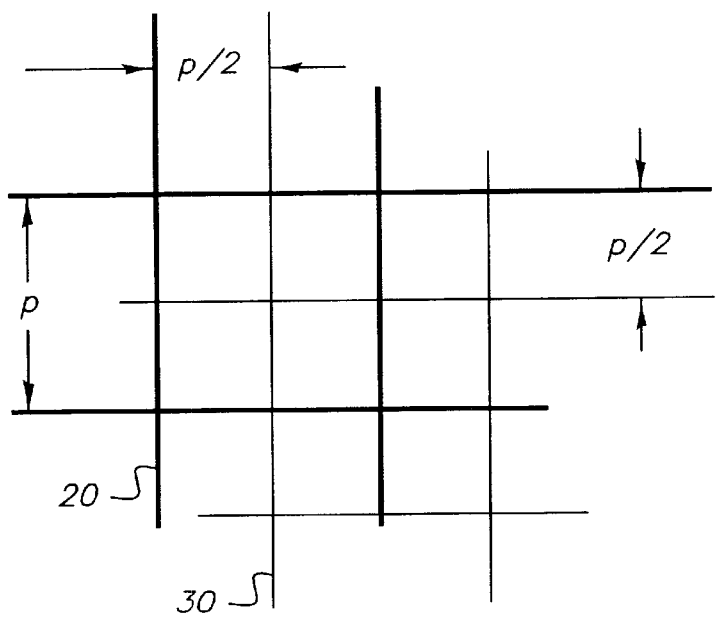
FIG. 4 is an illustration of a reference raster grid and a shifted raster grid.

With reference now to FIG. 4, both a reference raster (shown in dark grid) and a shifted raster (shown in lighter grid) are identified. The shifted raster may be shifted by p/2 in both the horizontal and vertical directions from each of the pixel locations in the primary raster. As shown in FIG. 4, the reference raster, 20, has spacing p, and the shifted raster, 30, is shifted by p2 in both directions. In response to an image pixel value, the printer may deposit a drop on a receiver sheet, the drop being deposited on one or both of the reference raster and shifted raster. It will be understood that rasters are not printed on the receiver sheet but represent a grid pattern of potential pixel locations.

Although the nozzle pitch dimension described herein is the same as that of the reference raster grid pitch dimension; i.e. spacing between centers of adjacent pixels on the reference raster, the nozzle pitch may not be identical and the nominal spacing could be greater than the spacing between the reference raster grid lines and accommodation made in the printing mode through control of signals to the printhead in the fast scan direction with printing at appropriate predetermined intervals to provide a desired pitch spacing for the grid in the fast scan direction and with control of movement of the media in the slow scan direction to provide the desired pitch spacing of the grid in the slow scan direction. It will also be understood that the reference raster grid need not have the pitch spacing in the fast scan direction that is the same as that in the slow scan direction. Similarly, the shifted raster may have similar characteristics as described above for the reference raster. It is preferred to have the pitch spacing between pixel centers on the shifted raster be the same as that on the reference raster with an offset of one-half nominal pitch spacing in two dimensions as illustrated.

Referring now to FIG. 5A, an ink jet printer system is shown in which a controller, 130, controls a printhead, 140, a print head controller and driver, 150, and a print media controller and driver, 160. The controller 130, which may include one or more microcomputers suitably programmed, provides signals to the printhead controller and driver 160 that directs the print head driver to move the print head in the fast scan direction. While the print head is moving in the fast scan direction, the controller directs the print head to eject ink drops onto the print medium at appropriate pixel locations for the reference raster when pixels on the reference raster are being printed. In a subsequent pass the controller, while the printhead is moving in the fast scan direction, directs the printhead to eject ink drops onto the print medium at appropriate pixel locations of the shifted raster when pixels on the shifted raster are being printed. During a single pass printing is only made on one of the rasters, reference or shifted, but not both. Suitable signals are provided to the print head from the print head controller so as to print the image data at the appropriate pixel locations on the receiver sheet. After a print pass, the controller media controller directs the print media drive 170 to move the print medium in the slow scan direction. Signals output from the print head controller are responsive to data signals input thereto from a suitable electronic data source that provides a data file of an image to be printed.

To achieve full coverage, the print head controller 150 directs the print head to eject an arrangement of drops. In the preferred embodiment, this arrangement consists of a large drop ejected onto the reference raster, and a small drop ejected onto the shifted raster.

Figure 6:
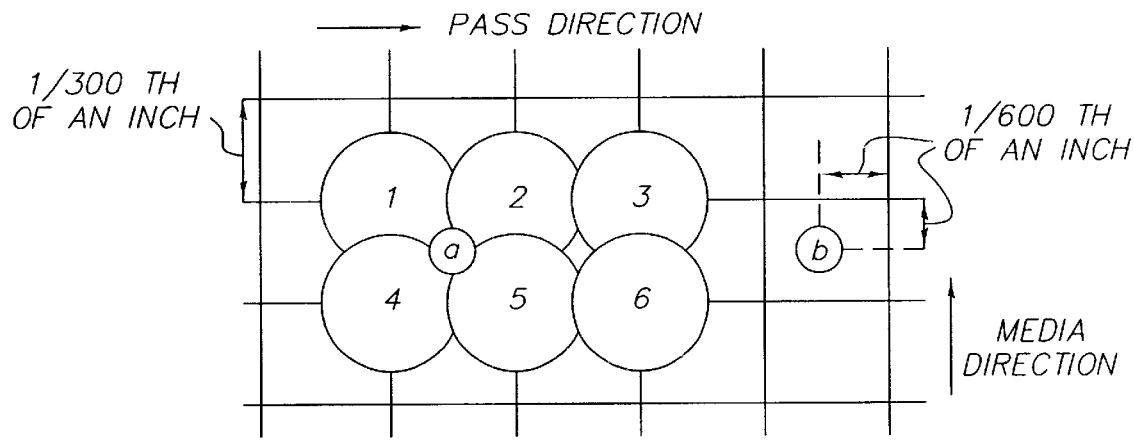
FIG. 6 is an illustration of printing on a reference raster and a shifted raster to demonstrate the concept of the supplementary dot on the shifted raster and providing for full coverage of ink without any white spots showing from the background even though the maximum dot size used is advantageously less than that which can provide full coverage to reduce ink consumption and improve drying time.

Shown in FIG. 6 is an arrangement of drops which illustrate one feature of the invention. For the cluster the arrangement is a three by two cluster of large drops (drops 1–6) placed on the reference raster, and a small drop (drop "a") placed on the shifted raster. In a preferred embodiment, the large drops are not large enough to achieve full coverage and a gap remains in the center of the cluster. However, a single small drop is large enough to cover the gap. This arrangement of drops not only achieves full coverage but also does so with a lower volume of ink per unit pixel. The position of the small drop "b" is used to illustrate the position of the shifted raster to the reference raster.

Figure 7:
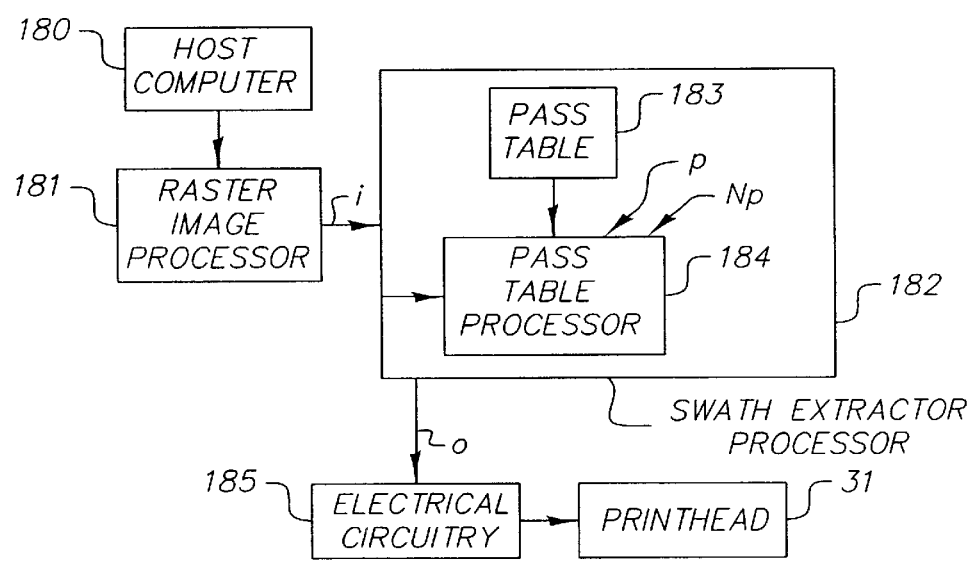
FIG. 7 is a block diagram schematic view of an image processing architecture that may be used with the invention.

FIG. 7 shows a simplified image processing sequence for a monochrome ink jet printer that shows more detail then shown in FIG. 6. In response to a job the request a host computer 180 sends digital signals to a raster image processor 181 for conversion of the signals to an image signal i. The image signal i is a two dimensional array composed of individual picture elements, or pixels, having number of rows w and number of columns h. For color printers, a two dimensional array is created for each color channel, which in turn corresponds to an ink. For color printers, the image signal i is the collective set of two dimensional arrays. The raster image processor may perform standard image processing functions such as the sharpening, resizing, color conversion, and multitoning to produce a multitone image signal.

For a binary print head, the image signal i for a monochrome printer is capable of printing only one drop size and only one drop per pixel. The location of each pixel is described by (x,y) coordinates, where x is the row and y is the column. Each pixel contains a numeric code value that corresponds to the amount of ink to be placed at the corresponding image pixel. Thus, the range of pixel code values defines the number of different density levels that can be printed. In the binary example, the code values are either 0 or 1, indicating that two density levels can be printed. It is important to note that the present invention may be used by any type of printer, preferably multitone printers.

Referring again to FIG. 7, the image signal i is converted to a printhead image signal o by the swath extractor processor and 182 of a reference printhead signal The pass table 183 is a two dimensional look-up table that contains values of a reference printhead signal as a function of density leveling pass number. The data values contained in the pass table 183 may be in a variety of different formats such as will be explained below. For example, the electronic circuitry that activates the print head may be designed to accept ink drop volumes in picoliters. Thus, the electronic circuitry that activates the print head would convert the print head image signal o, which would contain desired ink drop volumes, into electrical signals that instruct the print head to produce the desired volumes to form dots of the desired size or optical density. It is important to note that the format of the data values in the pass table 183 is not fundamental to the invention, and the invention may be applied to create a printer image signal o for any particular print head by using the appropriate data values in the pass tables 183.

In providing signals to the print head a swath of data is determined by the swath extractor processor 182. A swath of data is defined as a subset of multitoned image signal i that is required during one motion of the print head across the page. As noted below mask tables are associated with the processor 182 to reduce coalescence of adjacent ink drops by employing print masking. The various tables described herein may be stored on a disc storage medium in a computer which implements the swath extractor processor. Alternatively, the swath extractor processor may be implemented in an imbedded computer within the ink jet printer and the various tables stored in programmable memory within the printer. One skilled in the art will recognize that their many different hardware configurations for the swath extractor processor and many different storage options for the various tables described herein may be constructed and that the present invention may be applied to any of the different configurations.

The following definitions apply within the context of this document.

| Term | Definition |
| --- | --- |
| Print Head | A collection of nozzles printing one color of ink comprising one or more integrated sub-assemblies. |
| Print Pass | A pass of the print head during which ink is ejected onto the receiver media. |
| Swath | A rectangular region of the receiver media whose width is equal to the width of the image and whose height is equal to the height of the print head. |
| Dot Pitch | The horizontal or vertical spacing between pixels, which may be for example either $1/300^{th}$, $1/600^{th}$, or $1/1200^{th}$ of an inch. |
| Reference Raster | A 2-D grid of addressable locations, each location associated with a pixel, where the distance between grid points is given by the dot pitch. |
| Shifted Raster | A 2-D grid of addressable locations, which is shifted with respect to the reference raster by for example ½ the dot pitch in each direction. The dot pitches of the shifted raster are for example $1/300^{th}$ and $1/600^{th}$ of an inch. A shifted raster may not the required for 1200 dpi printing. |
| Low Resolution Raster (Printhead Resolution Raster) | A 2-D grid of addressable locations which may be a subset of the reference raster. This is determined by the native resolution of the printhead (300 DPI printhead). For 300 dpi printing, the reference raster and the low resolution raster are the Same, Both having dot pitches of 300 dpi. For 600 dpi printing, the reference raster is 600 × 600 dpi and equals the union of two interleaved low resolution rasters at 300 × 600 dpi. For 1200 dpi printing the reference raster is 1200 × 1200 dpi and equals the union of four interleaved low resolution rasters at 300 × 1200 dpi. |
| Low Resolution Shifted Raster (Printhead Resolution Shifted Raster) | A 2-D grid of addressable locations which may be a subset of the shifted raster corresponding to the low resolution raster. For 300 dpi printing, the shifted raster and the low resolution shifted raster are the same, both having dot pitches of 300 dpi. For 600 dpi printing, the shifted raster is 600 × 600 dpi and equals the union of two interleaved low resolution shifted rasters at 300 × 600 dpi. For 1200 dpi printing, a shifted raster is not used. |
| Low Resolution Accumulator($A_{LR}$) | Accumulated count during printing of the number of times the print head has been positioned to print on the low resolution raster which combines a reference raster And shifted raster. One of these is required during 300 dpi printing, and two are required during 600 dpi printing. These accumulators are not used during 1200 dpi printing. |
| Reference Raster Accumulator($A_{RR}$) | Accumulated count during printing of the number of times the print head has been positioned to print on the reference raster. One of these is required during 300 dpi printing, and two are required during 600 dpi printing. These accumulators are not used during 1200 dpi printing. |

-continued

| Term | Definition |
|---|---|
| Shifted Raster Accumulator ($A_{SR}$) | Accumulated count during printing of the number of times the print head has been positioned to print on the shifted raster. One of these is required during 300 dpi printing, and two are required during 600 dpi printing. These accumulators are Not used during 1200 dpi printing. |
| Resolution Passes ($N_R$) | Minimum number of print passes that are required to achieve the desired dot Pitch. For 300 dpi printing $N_R = 1$, for 600 dpi printing $N_R = 2$, and for 1200 dpi Printing $N_R = 4$. |
| Banding Passes ($N_B$) | Extra print passes that are required to isolate the ink droplets both spatially And temporally. Allowed values for example are {2,4,8}. So for example a value of 2 implies the drops are distributed over 2 print passes. |
| Shifted Passes ($N_S$) | Extra print passes that are required to print on the shifted raster. Allowed Values are 1 or 2. |
| Total Passes ($N_T$) | Total number of print passes required to print all drops in a swath, where $N_T = N_R \cdot N_B \cdot N_S$. |
| Low Resolution Passes($N_{LR}$) | Number of print passes required to print all drops in a swath on one of the Low Resolution rasters and the corresponding low resolution shifted raster, where $N_{LR} = N_B \cdot N_S$. |

Consider the examples in the following table:

| Example Number | Mode (dpi, bits/pix, banding passes) | Ink Volumes (pl) | $N_R$ | $N_B$ | $N_S$ | $N_T$ | LR |
|---|---|---|---|---|---|---|---|
| 1 | 300/1/2 | 0, 64 | 1 | 2 | 1 | 2 | 2 |
| 2 | 300/1/2 | 0, 72 | 1 | 2 | 2 | 4 | 4 |
| 3 | 300/2/2 | 0, 16, 48, 64 | 1 | 2 | 1 | 2 | 2 |
| 4 | 300/2/2 | 0, 16, 48, 72 | 1 | 2 | 2 | 4 | 4 |
| 5 | 300/4/2 | 0, 8, 16, 32, 48, 64, 72 | 1 | 2 | 2 | 4 | 4 |
| 6 | 300/4/2 | 0, 16, 24, 32, 40, 48, 56, 64, 72 | 1 | 2 | 2 | 4 | 4 |
| 7 | 300/4/2 | 0, 8, 16, 24, 32, 40, 48, 56, 64, 72 | 1 | 2 | 2 | 4 | 4 |
| 8 | 600/2/2 | 0, 16, 32 | 2 | 2 | 1 | 4 | 2 |
| 9 | 600/2/2 | 0, 8, 16, 24 | 2 | 2 | 2 | 8 | 4 |
| 10 | 1200/1/4 | 0, 8 | 4 | 4 | 1 | 16 | 4 |

The "Ink Volumes" column lists possible ink volumes (in picoliters) which could be associated with the raster code values in that mode. In example 1, a raster image processor (RIP) outputs to the printhead image data at a minimal resolution of 300 DPI. The printing resolution designated by the RIP is printing; i.e. one bit per pixel bit depth printing. In order to reduce coalescence of ink drops where two adjacent ink drops are deposited substantially simultaneously, the prior art recognizes the desirability of employing a technique known as print masking to employ two or more passes of the printhead across the image wherein during the first pass each 2×2 grid of pixels may have pixels arranged along a first diagonal of the grid printed and during this second pass pixels arranged along a second diagonal of the grid may be printed. Print masking logic tables for printing during the first pass and the second pass are typically provided. In the logic table pass tables described below a "1 " in this example indicates the pixel location that may be printed during the pass if the image data so specifies printing of a dot at that pixel location. A "0" indicates that during such pass and at that pixel location no dot may be printed even though the data identifies that location for printing of dot. The logic table for the second pass is complementary to that of the first pass so that data to be printed at respective pixel locations will be printed during one of the two passes. In the example of print masking technique illustrated it will be noted that during a pass available pixel positions for placement of drops are restricted to being along a diagonal. Other known print masking techniques employ different drop placement algorithms. For example, in a 2×2 grid of pixels some algorithms only select one of the four available positions for printing during a pass and thus four passes are required to print an image swath on a reference raster. Thus, the example number 1 is fully explained.

In considering the next example, example 2, there is an assumption that the maximum drop volume output by a nozzle at a pixel location at one time is 64 picoliters. In example 2 the raster image processor has output image data at a nominal resolution of 300 DPI with one bit per pixel bit depth which as noted for example 1 is printed in two banding passes to take advantage of print masking to avoid drop coalescence of adjacent drops. The number of banding passes will be stated by the RIP as part of its program. As noted above the number of banding passes in this example may be 1, 2,4 or 8. In comparing example 1 with example 2, it will be noted that although the binary image file coming from the RIP is identical to example 1 the RIP has also identified a requirement for printing with a drop size of 72 picoliters. The printer in response to this command from the RIP accommodates the command by printing a 64 picoliter drop at the identified pixel location on the reference raster and a supplementary 8 picoliters drop at an adjacent location on the shifted raster grid. The concept of printing on the shifted raster is illustrated in FIG. 6 wherein pixels 1–6 are maximum size pixels that can be printed on the reference raster grid and having the indicated resolution of 1/300th of an inch. A secondary grid also of 1/300 of an inch but separated from the main grid by 1/600 of an inch in both the pass direction and media advancement direction (Arrow C) is also provided, it being understood that the grid lines are not printed on the media but represent possible pixel printing locations. In this regard printing by the printhead during a print pass across the media, as indicated by the arrow in FIG. 6 of the pass direction, will be during any pass either for placement of ink drops at pixel locations on the reference raster or the shifted raster but not both during such pass. Thus this will explain the differences between the number of total passes printed for the example 2 is 4 while the total number of passes printed for example 1 is 2, there being two additional passes in example 2 for printing the supplementary pixels on the shifted raster to accommodate the larger drop size request by the RIP.

For Examples 3 and 4, it will be noted that the RIP is calling for pixels to be placed at 300 DPI print resolution with a two bits per pixel bit depth and using two banding passes (print masking). In example 3 all the ink drop sizes requested by the RIP are within the capability of the printhead at that print resolution and no printing on the shifted raster is required. Thus the total number of passes in example 3 are two. However, in example 4 the requirement for printing with a 72 picoliters drop size requires printing on the shifted raster to accommodate the extra drop size and two more total passes are required.

In Examples 5, 6 and 7, the RIP is requesting printing at 300 DPI resolution with four bits per pixel bit depth and using two banding passes. However, in all of these examples drop sizes of 72 picoliters are requested. Thus, printing on the shifted raster is required in the examples 5,6 and 7 and total number of passes are 4 in each example, because the use of print masking requires two banding passes for printing on the reference raster and two banding passes for printing on the shifted raster to avoid coalescence of ink drops.

Although in reading above the impression might be obtained that printing on the shifted raster is only for providing supplementary drops for printing of the drop volume beyond that of the capability of the printer nozzle the concept of printing on the shifted raster also contemplates that drop sizes not available to the printhead during a particular printing mode may also be accomplished through printing using the shifted raster. For example, consider that the printhead has the ability of printing at say a 300 DPI resolution drop volumes of say 0,8,16,32,48 and 64 picoliters from each nozzle as the printhead traverses across the print media. Since the concept of the shifted raster is being used in any event to accommodate requests by the RIP for printing ink drops of 72 picoliters other drop sizes requests may also be accommodated as will now be described. A drop size request for printing a drop volume of 24 picoliters may be accommodated by printing a 16 picoliters drop on the main raster and a supplementary 8 picoliters drop on the shifted raster at adjacent location to the 16 picoliters drop. Other intermediate drop volumes may be accommodated with the RIP being totally ignorant that this is occurring since the elegance of the concept of the shifted raster has the implementation carried out by the printer while the raster image processor is totally ignorant of the fact that the printhead is only capable of printing the five drop sizes identified above but yet may be requesting printing of number of drop sizes beyond that of the normal printer capability. The concept of the shifted raster may also be extended by printing drop sizes not of just say the same supplementary 8 picoliters drop sizes on the shifted raster grid. For example at a request for printing of a drop size of 80 picoliters, the printhead may fulfill this request by printing a 64 picoliters drop on the reference raster and a 16 picoliters drop on the shifted raster. Thus, the concept of the shifted raster extends the exposure space capability of the printer or the effective number dot sizes or optical densities that may be printed by the printer. A person inputting a print job from a host computer can designate, for example, that printing be done with 9 or 10 pixel sizes at say 300 DPI print resolution. Although, the printer nozzles can only produce drop volumes of say five different sizes the job can still be printed by the printer, with the RIP assuming that the printer has the ability to print the requested 9 or 10 drop volume sizes. As will be described below, the printer is adapted to accommodate these requests by recognizing which pixels need to be accommodated through the printing of supplementary drops on the shifted raster. It is important to keep in mind that once printing on the shifted raster is being done, for example to accommodate a request for a pixel of 72 picoliters by printing the 8 picoliters supplementary drop on the shifted raster, an 80 picoliters drop volume request may be also accommodated during the same band passes for shifted raster printing as well as any of the other supplementary drops required for accommodating intermediate drop sizes that are not available to the printhead when printing on the reference raster. Thus, although concept of shifted raster has increased the number of band passes, the additional flexibility of providing for greater bit depth printing is an added benefit. A further benefit to the concept of printing on the shifted raster is also provided in that as noted for FIG. 6 full coverage of an area can be provided without applying excessive drop sizes to accomplish same and thus faster drying of prints can result. In accordance with the invention, a supplementary drop deposited between a cluster of say four pixels on the reference raster in a 2×2 configuration can fill in a white space where the largest drop size printed does not provide sufficient overlap to eliminate the white spot between the cluster of four dots. The description herein clearly shows that for enhanced drying it is better to rely on smaller drops for printing with use of shifted raster and to provide a fill in drop of the same color ink for complete coverage rather than to use four large drop sizes that have substantial overlap.

Examples 8 and 9 in the chart above illustrate the use of the shifted raster in 600 DPI mode as well as the penalty for placing 8 pl drops on the Shifted Raster.

Example 10 illustrates printing of a request at 1200 DPI resolution wherein the bit depth is one or binary. Because of the closeness of the dots placed on the reference raster four banding passes are requested by the RIP for print masking. No printing on the shifted raster is done in this example.

It will be understood that after each set of banding passes for printing a swath on say the reference raster, the receiver sheet is indexed a small distance according to the print mode. Thus, for example, for the first seven examples above the printing resolution on the reference raster is 300 DPI and after the two banding passes for printing on the reference raster the receiver sheet will be indexed $1/600$ of an inch for printing on the shifted raster if required in that mode. The printhead is also controlled to print across the receiver sheet 300 DPI on the shifted raster but the locations for the pixels on the shifted raster grid are shifted $1/600$ of an inch from those locations on the reference raster. Thus for printing at 300 DPI resolution the printhead moves in $1/300$ increments for printing whether it is printing drops on the reference raster or the shifted raster.

The shifted raster approach can be extended to 600 DPI. In that mode the raster would be shifted $1/1200$th of an inch in each direction. The shifted raster approach can be used in combination with bi-directional or uni-directional printing, as well as an arbitrary number of banding passes.

The shifted raster mode and the use of 8 pL drops to satisfy the above constraint is preferably directed by look up tables in the printer as will be described below.

In accordance with the invention an image chain architecture is provided for the printer which optimizes discrete drop volumes using a variety of media receivers. Six factors determine the selectable imaging chain operations in the print engine which produce optimized drop volumes depending on a given combination of factors. Each of these factors are requested by the RIP for each print job sent to the printer. These factors are:

a) Resolution (DPI);
b) Bit Depth or Bits per pixel (BPP);
c) Number of banding passes (a print masking consideration);
d) Printing direction, printing in forward only (unidirectional) and printing also during return (bi-directional);
e) Ink;
f) Media Examples for combinations of DPI, BPP and banding passes that comprise a Print Mode:

| DPI | Bits per Pixel | Banding Passes |
|---|---|---|
| 1200 | 1 | 2 |
| 1200 | 1 | 4 |
| 600 | 2 | 2 |
| 600 | 2 | 4 |
| 300 | 1 | 2 |
| 300 | 2 | 4 |
| 300 | 4 | 2 |
| 300 | 4 | 4 |
| 300 | 4 | 8 |

Since each of these combinations can be printed uni-directionally or bi-directional there are, therefore, a total of 18 print modes which can be selected with every combination of ink and media in this example. It will be understood of course that the above are just examples and are not provided as limitations of the invention herein.

Figure 8:
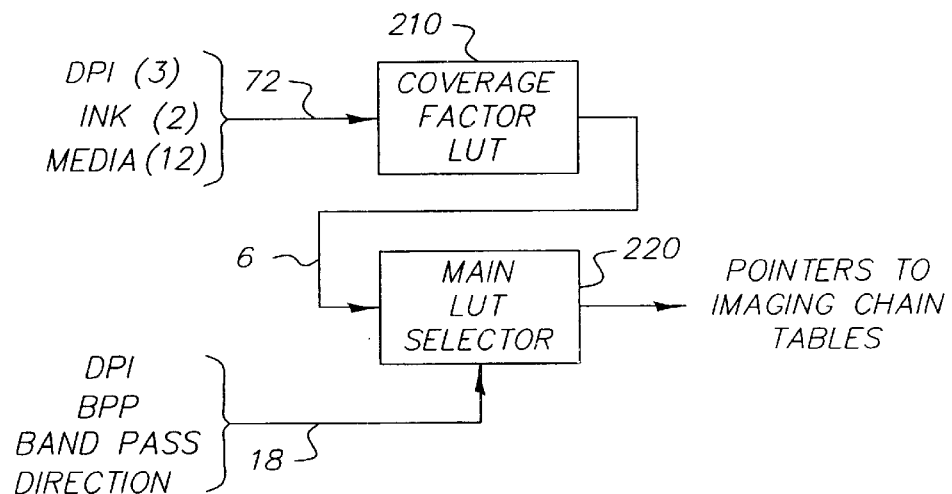
FIG. 8 is a schematic of lookup tables which are used to reduce the amount of memory required in the image processing architecture.

With reference to FIG. 8, The RIP specifies DPI, ink type and media type. This results in a significant number of drop volume possibilities for the printer to deal with for each and every media. The Coverage Factor LUT 210 reduces the number of options available. This LUT will define, for every possible combination of DPI, ink types and media types, which factor to use.

Coverage factor is internal to the printer and known only by the printer. The RIP does not have access to this parameter, thereby greatly reducing the complexity of the host software programs that interface to the printer. The coverage factor is determined experimentally by using all different combinations of DPI, ink and media and making numerous different sample prints. In the example provided there are three permitted printing resolutions (DPI). Two ink types (this may be optional for some printers may assume only one type ink is to be used; i.e. dye or pigment types) are also assumed. Twelve different media types are also assumed which represent media of different types of surfaces that are suited for use with the printer as a job request. As will be shown below, these 72 combinations represent quite a large number. However, by scanning of all the various combinations of prints made a determination can be made of possible overlaps or equivalencies regarding ink coverage. The 72 combinations can be reduced down to, for example, six different coverage factors, this number not being critical it being understood that it comprises a substantial reduction from having the 72 brute force combinations. The coverage factor lookup table may be a 3×2×12 table that maps the DPI, ink and media into a coverage factor.

In response to the input combination of a specific resolution (DPI), ink and media by the RIP, a code representing the coverage factor found for this combination is output to a main look up table selector to 220. Also input to this look up table are other factors. The RIP will further specify resolution (DPI), bit depth (BPP), number of banding passes, and directionality (printing in one or two directions). The printer knows the ink and media. The DPI, ink and media determine the coverage factor via the Coverage Factor LUT.

The DPI, BPP, directionality and banding passes are combined with the coverage factor by the Main LUT selector to select which tables are to be used for the imaging chain.

Figure 9:
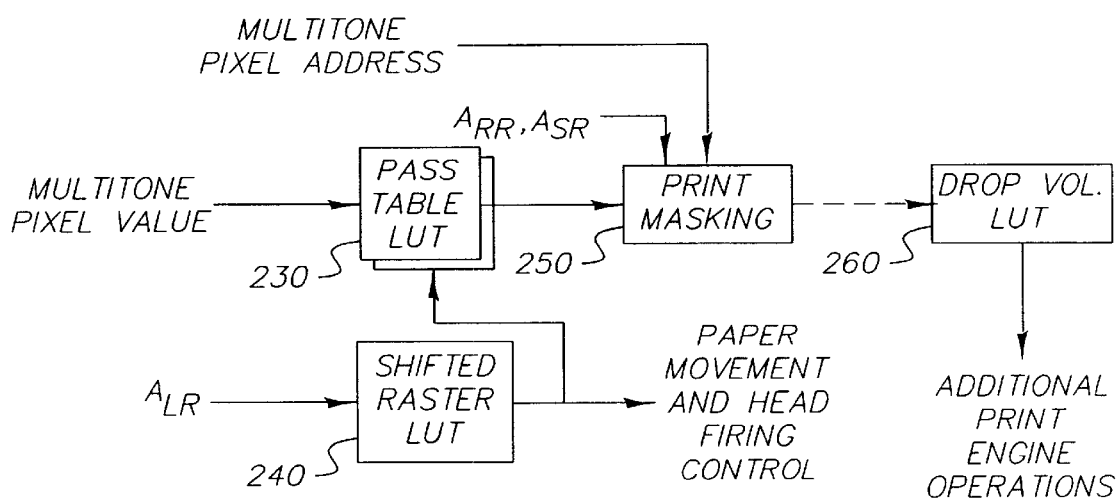
FIG. 9 is a schematic of one example of an image chain architecture which can be used using various table inputs and outputs.

For example, assume dye ink and glossy media are loaded in the printer. The RIP may prepare an image for printing at 300 DPI. This combination of ink and media at 300 DPI may require 72 pL at each pixel to achieve full coverage for said media, therefore, the coverage factor would indicate a print mode which delivers 72 pL at the max code value. In addition, the RIP would specify to the printer the BPP, number of banding passes, and print direction. This information, combined with the DPI, would identify one of 18 supported print modes. The identified print mode combined with the coverage factor would identify one of 108 sets of imaging chain tables. Each set of imaging chain tables includes all the tables, LUTs, and matrices needed to define the imaging chain for each color. Drop size mapping, print masking and shifted raster printing are accomplished using a Pass Table, Print Mask, Shifted Raster LUT and Drop Volume LUT. These operations are applied to the multitone image data received from the host, and illustrated logically in FIG. 9.

Pass Tables translate multitone data from the host, into ink volume indices representing ink drop volumes that are to be printed on the media. There are two Pass Tables 230, one is used when printing on the reference raster and the other is used when printing on the shifted raster. A Pass Table has one row for each multitone level and one column. The data entries in the Pass Table are drop volume indices. In the example provided there are 5 drop volume sizes that each nozzle is able to provide. The drop volume indices are stored as 3-bit numbers. The drop volume indices are translated through the Drop Volume LUT to specify the actual volume of ink placed on the page. Two sample Pass Tables are shown in FIGS. 10(a) and 10(b), where drop volume indices are indicated by letters to reduce confusion. The example of FIGS. 10(a) through 10(e) the RIP is requesting printing at 300 DPI, 2 bots per pixel, bit depth using 2 banding passes for print masking considerations.

These Pass Tables assume the Drop Volume LUT 260 shown in FIG. 10(e). In these Pass Tables, a multitone level of zero results in no ink being placed on the page. A multitone level of one results in a single 16 pl drop being printed on the reference raster. A multitone level of two results in a single 48 pl drop on the reference raster. Lastly, a multitone level of three results in a single 64 pl drop on the reference raster and an 8 pl drop on the shifted raster.

The Shifted Raster LUT 240 indicates when to print on the shifted raster. A Shifted Raster LUT is applied to a low resolution raster and its corresponding low resolution shifted raster. Therefore, there is one row for each print pass in the low resolution raster and the corresponding low resolution shifted raster, combined. The entries are either True (T) or False (F), where True means print on the shifted raster. A sample Shifted Raster LUT is shown in FIG. 10(c).

This Shifted Raster LUT indicates that the printer should print on the shifted raster on all the odd number print passes. Entries are read from the Shifted Raster LUT according to $$\text{ShiftIndicator}=\text{ShiftedRaster}LUT[A_{LR}\%N_{LR}],$$

where % is the mod operator, and $A_{LR}$ is the low resolution accumulator. As noted before, one accumulator is required for 300 DPI printing, however, two are required for 600 DPI printing. This is because for 600 DPI printing there are two interleaved low resolution rasters.

It may be decided in the interest of productivity that shifted raster printing will always be executed in bi-directional print mode, even if the RIP has requested uni-directional printing. Therefore, the printer must recognize that the print mode will require the shifted raster and override the RIP request if necessary. The entries in the Shifted Raster LUTs preferably alternate T, F, T, F, etc. Therefore, the reference raster, with bi-directional printing, will always be printed in one direction and the shifted raster will be printed in the other direction.

It may be decided to design the imaging chain architecture so that the shifted raster is only used in print modes that are referred to by the RIP as uni-directional, and never in print modes that are referred to by the RIP as bi-directional. The reason for this is that if a uni-directional print mode is defined to use the shifted raster, then the corresponding bidirectional print mode to NOT use the shifted raster would also be desirably be defined. Otherwise, a user of the printer will see no productivity difference between the two modes. Independent of this decision, it may be desirable to also define a uni-directional print mode to not use the shifted raster and a corresponding bi-directional print mode to NOT use the shifted raster also. Otherwise, again, the user of the printer will see no productivity difference between these two modes.

Print masking as noted above distributes the drops spatially and temporally over the available print passes. The Print Mask table 250, an example of which is shown in FIG. 10(d), is used to logically split the input image, on each low resolution raster and each low resolution shifted raster, up into data buffers (not shown). The following print mask equations may be used to combine the Print Mask and Pass Tables. Equation (1) is selected if the Shifted Raster LUT indicates that the next print pass shall be on the reference raster, and equation (2) is selected if the Shifted Raster LUT indicates that the next print pass shall be on the Shifted Raster.

$$\text{data}[i][j]=RR\text{PassTable}[\text{input}[i][j]]\& \ ((\text{mask}[i\%m_x][j\%m_y])=(A_{RR}\%N_B)) \quad (1)$$

$$\text{data}[i][j]=SR\text{PassTable}[\text{input}[i][j]]\& \ ((\text{mask}[i\%m_x][j\%m_y])=(A_{SR}\%N_B)) \quad (2)$$

In these equations, input$[i][j]$ is the multitone level at pixel (ij) in the multitone input image, $A_{RR}$ and $A_{SR}$ are the reference raster and shifted raster accumulators, mask is the print mask, $(m_x, m_y)$ is the width and height of the print mask, RRPassTable is the Reference Raster Pass Table, SRPassTable is the Shifted Raster Pass Table, $N_B$ is the number of banding passes, data is the image data passed to the remainder of the imaging chain, and the percent symbol, %, indicates the mod operation.

According to the equation, the appropriate accumulator is moded by the number of banding passes. The result of this operation is compared with a value from the print mask which is tiled across the image in both directions. If the compare is true then a value from the appropriate pass table is passed to the data buffer. If the compare is false then a zero (no drop) is passed to the data buffer. The values in the print mask are in the range 0 to $N_B-1$.

The Drop Volume LUT provides the translation from drop index to ink drop volume. The Drop Volume LUT 260 may be fixed and need not be changed.

Figure 11:
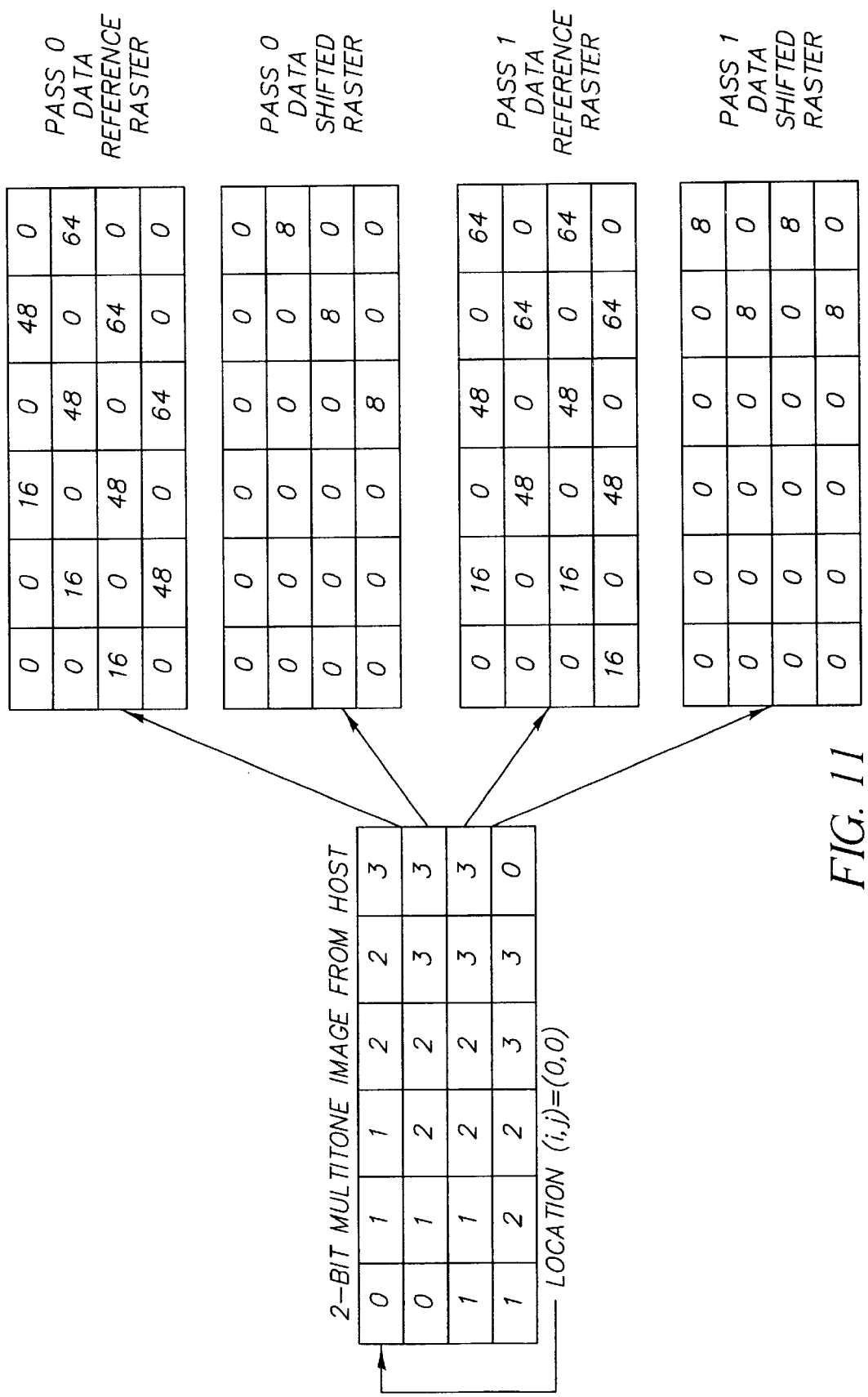
FIG. 11 is an illustration of an input request from a RIP requesting various dot densities at selected pixel locations and how those requests are fulfilled during each pass through deposits of ink drops of selected dot volumes by the printer.
Figure 14:
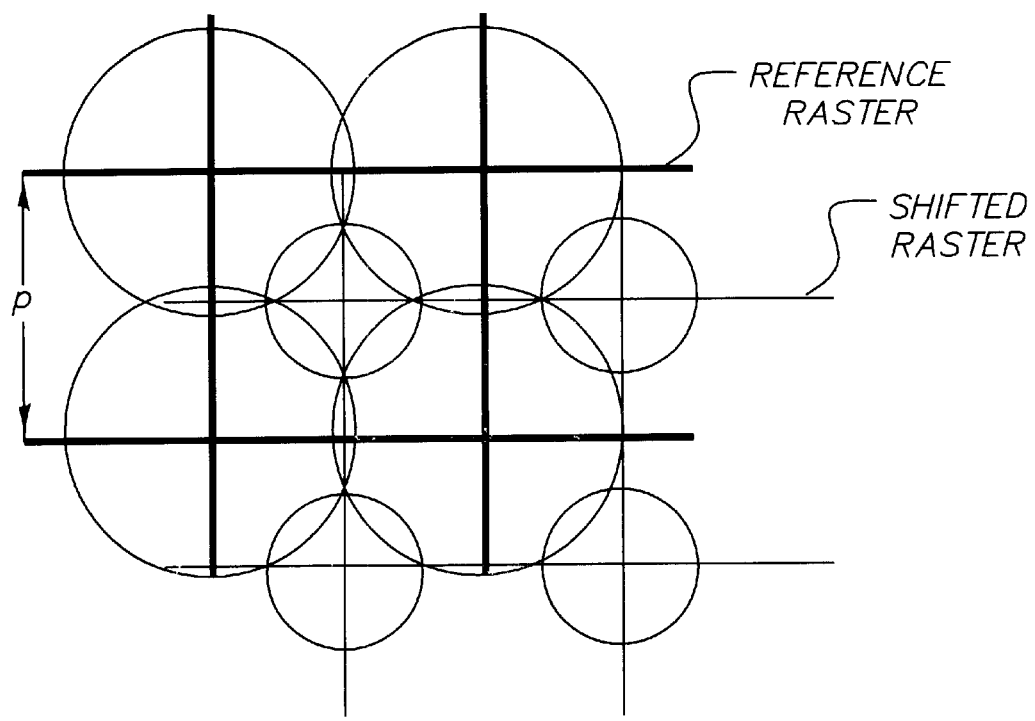
FIG. 14 is a diagram showing 4 larger drops on a reference raster and 4 smaller drops on a shifted raster to achieve full coverage.

To illustrate the use of the tables of FIGS. 10(a)–(e), consider with reference to FIG. 11 a 4×6 section of a multitone image received by the printer from the host. The printing mode is 300 DPI, 2 bits/pixel, 2 banding passes and since the shifted raster is used, $N_T=4$. This image is sent to a printer that is using the Pass Tables, Shifted Raster LUT, Print Mask, and Drop Volume LUT illustrated in FIG. 10.

Shown for each pass is the drop volume of ink in picoliters that should be placed on the page at each raster location. As indicated in the figure for this example, the pixel in the upper left corner is considered the (0,0) location. The 2-bit pixel in that location received from the host has a value of 0.

On the first print pass the value of $A_{LR}$ is zero, therefore, the Shifted Raster LUT indicates that the first print pass should be on the Reference Raster. Referring then to print masking equation (1) the value of $A_{RR}$ should be used. Since this is the first print pass the value $A_{RR}$ is also zero, therefore the mod with $N_B$ is zero. Secondly, the value in the Print Mask corresponding to first line and first pixel is also a zero, therefore, a drop volume index will be selected from the Reference Raster Pass Table. Row zero of the Reference Raster Pass Table is selected because the pixel value is 0. Therefore, it is seen that this pixel is rendered on the first pass of the reference raster with a drop of index A. From the Drop Volume LUT in section 0 this corresponds to a 0 pl drop.

The next pixel in the line, i.e., at location (0,1), has a value of 1. The value of $A_{LR}$ and $A_{RR}$ are still zero since no print passes have been completed. However, the value in the Print Mask corresponding to this line and this pixel location is a one. Since this is not zero, no drop volume index will be selected from the Reference Raster Pass Table. Therefore, it is seen that this pixel is also rendered on the first pass of the reference raster with a drop of index A. From the Drop Volume LUT this corresponds to a 0 pl drop.

The next pixel in line at location (0,2) also has a value of 1. Since the Print Mask is tiled across the image in both directions, the value in the Print Mask corresponding to this line and this pixel location is a zero. Therefore, the drop volume index will be selected from the Reference Raster Pass Table. Row one of the Reference Raster Pass Table is selected because the pixel value is 1. Therefore, it is seen that this pixel is rendered on the first pass of the reference raster with a drop of index C. From the Drop Volume LUT this corresponds to a 16 pl drop.

The rest of the pass buffer is constructed in the same fashion and the drops deposited on the page. After the first print pass the value of $A_{LR}$ and $A_{RR}$ are incremented. For the next print pass the value of $A_{LR}$ is one, therefore, the Shifted Raster LUT indicates that the next print pass should be on the Shifted Raster. The paper should be positioned so that the nozzles are lined up with the shifted raster.

Considering again the pixel in the upper left corner, at location (0,0), the 2-bit pixel in that location received from the host has a value of 0. Referring then to print masking equation (2) the value of $A_{SR}$ should be used. Since this is the first print pass over the shifted raster the value $A_{SR}$ is zero. Secondly, the value in the Print Mask corresponding to first line and first pixel location is also zero. Therefore, the drop volume index will be selected from the Shifted Raster Pass Table. Row zero of the Shifted Raster Pass Table is selected because the pixel value is 0. Therefore, it is seen that this pixel is rendered on the first pass of the shifted raster with a drop of index A. From the Drop Volume LUT this corresponds to a 0 pl drop.

Continuing to fill the pass buffer for a print pass over the shifted raster, consider the last pixel in the second line, at location (1,5), which has a value of 3. Since the Print Mask is tiled across the image in both directions, the value in the Print Mask corresponding to this line and this pixel location is a zero. Since the value of $A_{SR}$ is still zero, the drop volume index will be selected from the Shifted Raster Pass Table. Row three of the Shifted Raster Pass Table is selected because the pixel value is 3. Therefore, it is seen that this pixel is rendered on the first pass of the shifted raster with a drop of index B. From the Drop Volume LUT this corresponds to an 8 pl drop.

The rest of the pass buffer is constructed in the same fashion and the drops deposited on the page on the shifted raster. After the print pass the value of $A_{LR}$ and $A_{SR}$ are incremented. For the next print pass the value of $A_{LR}$ is two, therefore, the Shifted Raster LUT indicates that the next print pass should be on the reference raster and the paper should be positioned so that the nozzles are lined up with the reference raster.

With reference to FIGS. 12(a)–(e), there is shown an example of the print mode wherein the RIP is requesting printing at 300 DPI resolution at 4 bits per pixel bit depth and using four banding passes for print masking considerations. The 4 bits per pixel from the RIP are requesting eleven ink volumes shown (zero, 8, 16, 24, 32, 40, 48, 56, 64, 72, 80). However, as noted from the Drop Volume LUT each nozzle is only adapted to print six drop volume sizes including zero. However, using shifted raster a 24 picoliters drop volume may be created using a drop of 16 picoliters on the reference raster and a drop of 8 picoliters on the shifted raster. Similarly, a 24 picoliters drop may be simulated using a 16 picoliters drop on the reference raster and an 8 picoliters drop on the reference raster. This is also true for a 40 picoliters drop which is simulated by a 32 picoliters drop on the reference raster and an 8 picoliters drop on the shifted raster and for a 56 picoliters drop which is simulated by a 48 picoliters drop on the reference raster and an 8 picoliters drop on the shifted raster. The production of the 72 picoliters drop using a 64 picoliters drop on the reference raster and an 8 picoliters drop on the shifted raster has been discussed previously. As also noted above the shifted raster may also be used in to produce larger size drops then the 8 picoliters noted in the previous examples. Thus an 80 picoliters drop is produced during printing on the shifted raster by printing a 16 picoliters drop on the shifted raster with the 64 picoliters drop on the reference raster pixel location adjacent thereto.

With reference to FIGS. 13(a)–(e), there is shown still another example of a print mode. In this example the RIP is requesting printing at 300 DPI resolution, 4 bits per pixel bit depth, and two banding passes for print masking considerations. For such printing, assume that only seven dot sizes are to be used for printing (0, 8, 16, 32, 48, 64, 72). In this example, all the dot sizes may be accommodated by the print head except for 72 for which the shifted raster is employed as will now be obvious from the above description.

It will be noted in the various examples presented herein that during a set of passes involving consecutive motions of the print head over the same region of the page for example for printing on the reference raster that the receiver has not moved until all the passes are completed. However, interlacing techniques are known or the page may be advanced for example ¼th of the print head height after each pass. The invention applies equally well to such forms of print masking or interlaced swath printing.

The arrangement of drops not only achieves full coverage but also does so with a lower volume of ink per unit pixel. Consider a typical dot diameter to drop volume relationship given by $$d=15*v^{0.5}, \qquad (Equ 3)$$

where d is the dot diameter in microns and v is the drop volume in picoliters. Therefore, the drop volume is given by $$v=d^2/225. \qquad (Equ 4)$$

The total drop volume per unit pixel to achieve full coverage is given by the sum of both the large drop volume and the small drop volume, i.e., $$V_t=V_1+V_2, \qquad (Equ 5)$$

where $V_1$ is the volume of the large drop and $V_2$ is the volume of the small drop. At the one extreme the large drop is large enough to achieve full coverage as shown in FIG. 3, and therefore $V_2=0$. At the other extreme the large drop and the small drop are the same size (not shown) and therefore $V_1=V_2$. It can be shown that given the raster spacing, p, and the diameter of the large drop, $d_1$, then in order to achieve full coverage the diameter of the small drop, $d_2$, must be at minimum given by $$d_2=(p-(d_1^2-p^2)^{0.5}). \qquad (Equ 6)$$

Combining equations (4), (5) and (6) yields $$V_t=(2/225)(d_1^2-p(d_1^2-p^2)^{0.5}) \qquad (Equ 7)$$

Figure 15:
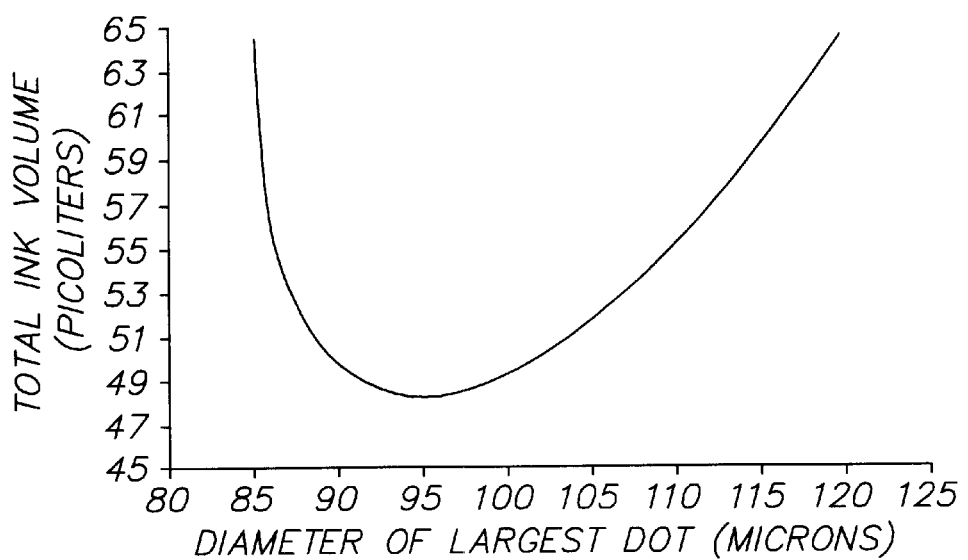
FIG. 15 is a diagram plotting the total ink volume as a function of the largest dot diameter to achieve full coverage.

This equation is plotted in FIG. 15 for p=85 microns which approximates the raster spacing for 300 DPI. At the one extreme where a small drop is not needed, the dot diameter corresponding to the large drop is given by $85*2^{0.5}=120$ microns. At the other extreme in which the large drop and small drop are the same size, both diameters are equal to the raster spacing, i.e., 85 microns. It can be seen from FIG. 15 that for every drop size between these two extremes less total ink volume is required to achieve full coverage.

One skilled in the art will recognize that relationship plotted in FIG. 15 is based upon the typical dot size to drop volume relationship stated in equation 3. The shape of the curve in FIG. 15 will vary depending on the particular dot size to drop volume relationship chosen. Ink jet inks used to image recording elements used in the present invention are well known in the art.

Other implementations of the invention may rely upon the collection or examination of image data to determine if for example 2×2 clusters are present in the image data to be printed on the reference raster. Where clusters are found these are indicative that full coverage is required and a supplementary drop on the shifted raster may be provided for. Thus presence of a cluster may be used as a criterion selection for determining when a supplementary drop is to be deposited on the shifted raster to provide for full coverage with reduced consumption of ink.

Image recording media used in the present invention are well known in the art. Examples of recording media include, but are not limited to, bond paper, sized papers, vinyls, textiles, matte coated papers, and photo quality papers having satin, semi-glossy, or glossy finishes.

The various implementations shown here are exemplary and as noted above may be practiced in different forms using a computer or discrete components for performing the logic operations described.

This invention describes a printing method and apparatus of achieving full coverage on a receiver medium using an inkjet printer employing multitone printing and a shifted raster. The invention thus provides for full ink coverage in interstitial pixel locations which would otherwise be left blank or which might otherwise be filled but with inefficient use of ink. The invention thus provides for improvements in dry time of the ink when printing with full coverage.

The invention has been described with particular reference to its preferred embodiments, but it will be understood by those skilled in the art that various changes may be made and equivalents may be substituted for elements of the preferred embodiments without departing from the invention. In addition, many modifications may be made to adapt a particular situation and material to a teaching of the present invention without the departing from the essential teachings of the invention.

What is claimed is:

1. An ink jet printer, comprising:
   an ink jet print head having an array of nozzles, each nozzle being capable of selectively producing when actuated at least two ink drop sizes including a larger ink drop size and a smaller ink drop size; and
   a controller providing, in response to each pixel density signal of maximum density value at a respective pixel location, a signal to a nozzle to print an ink drop of the larger ink drop size at the respective pixel location on a reference raster and a signal to a same or different nozzle to print an ink drop of the smaller ink drop size at a pixel location adjacent to the respective pixel location but on a shifted raster.

2. The printer of claim 1 wherein the array of nozzles are arranged in at least one row and including a print head drive for moving the ink jet print head in a fast scan direction perpendicular to the row of the array of nozzles; and
   print media drive for moving an ink jet print medium past the print head in a slow scan direction orthogonal to the fast scan direction.

3. The inkjet printer of claim 2 and wherein ink drops are of a size such that when depositing a 2×2 set or cluster of adjacent ink drops of the larger ink drop size in a reference raster a gap is left in the center of the cluster, and an ink drop of the smaller ink drop size when deposited on the shifted raster in the center of the 2×2 set of adjacent ink drops covers the gap.

4. An ink jet printer, comprising:
   an ink jet print head having an array of nozzles, each nozzle being capable of selectively producing when actuated an ink drop; and
   a controller responsive to a pixel density signal for controlling the print head for printing, in response to a signal calling for a maximum density value at a respective pixel location, a larger ink dot at the respective pixel location on a reference raster and a smaller ink dot at a pixel location adjacent to the respective pixel location but on a shifted raster and wherein the larger and smaller ink dots are of respective sizes such that for a 2×2 set or cluster of adjacent ink dots, each of the larger ink dot size and each at adjacent pixel locations of the reference raster, a gap is left in the center of the cluster, and the smaller ink dot on the shifted raster when in the center of the 2×2 set of adjacent larger ink dots is of a size to cover the gap.

5. The printer of claim 4 and wherein the controller controls the print head so that the larger dot on the reference raster is formed by multiple passes of the print head wherein an ink drop is deposited at the pixel location on each of the plural passes.

6. The method of claim 4 and wherein the controller controls the print head so that the larger dot on the reference raster is formed in only a single pass of the print head wherein a larger ink drop is deposited at the pixel location during the single pass during which pass only dots on the reference raster are printed and the smaller dot is formed by a smaller ink drop deposited during only another single pass of the print head during which another single pass of the print head printing of dots only on the the shifted raster occurs.

7. An ink jet printer, comprising:
   a) an ink jet print head having an array of nozzles arranged in at least one row, each nozzle being capable when actuated of selectively producing a larger drop or a smaller drop at a pixel location on a receiver medium;
   b) an ink jet print head drive for moving the ink jet print head in a fast scan direction perpendicular to the row of nozzles;
   c) a print media drive for moving the receiver medium past the print head in a slow scan direction orthogonal to the fast scan direction;
   d) a controller for controlling the size of drops from the nozzles, the print head drive and the print media drive for depositing ink drops in a reference raster, whereby a 2×2 cluster of four adjacent large ink drops in the reference raster leaves a gap in the center of the cluster, and for depositing a smaller ink drop in a shifted raster in response to a print signal for printing a maximum density dot on the reference raster whereby the smaller ink drop covers the gap in the cluster.

8. The ink jet printer claimed in claim 7, wherein the reference raster is formed by set of multiple passes of the print head and only dots on the reference raster are printed during each of the multiple passes of the set.

9. The ink jet printer claimed in claim 8, wherein the shifted raster is formed by a second set of multiple passes of the print head and only dots on the shifted raster are printed during each of the multiple passes of the second set.

10. A method of printing with an ink jet printer, comprising the steps of:
    providing an ink jet print head having an array of nozzles, each nozzle being capable of selectively producing when actuated at least two ink drop sizes including a larger ink drop size and a smaller ink drop size; and
    in response to each pixel density signal of maximum density value at a respective pixel location on a receiver printing an ink drop of the larger ink drop size at the respective pixel location on a reference raster and printing an ink drop of the smaller ink drop size at a pixel location adjacent to the respective pixel location but on a shifted raster.

11. The method according to claim 10 and wherein the array of nozzles are arranged in at least one row and including moving the ink jet print head in a fast scan direction perpendicular to the row of the array of nozzles;

and moving an ink jet print medium past the print head in a slow scan direction orthogonal to the fast scan direction.

12. The method of claim 11 and wherein ink drops are of a size such that when depositing a 2×2 set or cluster of adjacent ink drops of the larger drop size in a reference raster a gap is left in the center of the cluster, and an ink drop of the smaller ink drop size when deposited on the shifted raster in the center of the 2×2 set of adjacent ink drops covers the gap.

13. The method of claim 12 and wherein the nozzles when actuated are each capable of selectively producing ink drops of at least three drop sizes including the smaller ink drop size, the larger ink drop size and a largest ink drop size and wherein the size of the largest ink drop size is such that when depositing a 2×2 set or cluster of adjacent ink drops of the largest ink drop size in a reference raster no gap is left in the center of the cluster, and in response to a maximum density signal for a pixel location on the reference raster, the printer prints at the respective pixel location on the reference raster an ink drop of the larger ink drop size and also prints an ink drop of the smaller ink drop size at a pixel location adjacent to the respective pixel location but on the shifted raster so that the amount of ink deposited in a 2×2 set or cluster of adjacent ink drops of the larger drop size plus a smaller ink drop in the center of the cluster comprises less ink than the 2×2 set of adjacent ink drops of the largest drop size.

14. The method of claim 13 and wherein an image processor determines from a sequence of pixels that full coverage of an area is required and prints a 2×2 set or cluster of adjacent ink drops of the larger drop size plus an ink drop of the smaller ink drop size in the center of the cluster instead of the 2×2 set of adjacent ink drops of the largest drop size.

15. The method of claim 12 and wherein the printer is adapted to print on different respective types of media and, in response to an input of type of respective media being printed on and a respective density at a pixel location, the printer adjusts a signal to the nozzle to produce an ink drop at the pixel location of a respective ink volume so that in response to the same density signal of a pixel received as an input the printer prints an ink drop of different respective drop volume for each of different types of media.

16. The method of claim 12 and wherein the amount of ink deposited in a 2×2 set or cluster of adjacent ink drops of the larger ink drop size on the reference raster plus a smaller ink drop in the center of the cluster comprises less ink than would be provided by a 2×2 set of adjacent ink drops on the reference raster of the same ink type and same receiver media type but each of an ink drop size sufficient to provide no gap in the center of the cluster.

17. The method of claim 10 and wherein ink drops are of a size such that when depositing a 2×2 set or cluster of adjacent ink drops of the larger drop size in a reference raster a gap is left in the center of the cluster, and an ink drop of the smaller ink drop size when deposited on the shifted raster in the center of the 2×2 set of adjacent ink drops covers the gap.

18. The method of claim 17 and wherein the nozzles when actuated are each capable of selectively producing ink drops of at least three drop sizes including the smaller ink drop size, the larger ink drop size and a largest ink drop size and wherein the size of the largest ink drop size is such that when depositing a 2×2 set or cluster of adjacent ink drops of the largest ink drop size in a reference raster no gap is left in the center of the cluster, and in response to a maximum density signal for a pixel location on the reference raster, the printer prints at a respective pixel location on the reference raster an ink drop of the larger ink drop size and also prints an ink drop of the smaller ink drop size at a pixel location adjacent to the respective pixel location but on the shifted raster so that the amount of ink deposited in a 2×2 set or cluster of adjacent ink drops of the larger ink drop size plus a smaller ink drop in the center of the cluster comprises less ink than the 2×2 set of adjacent ink drops of the largest ink drop size.

19. The method of claim 17 and wherein the amount of ink deposited in a 2×2 set or cluster of adjacent ink drops of the larger ink drop size on the reference raster plus a smaller ink drop in the center of the cluster comprises less ink than would be provided by a 2×2 set of adjacent ink drops on the reference raster of the same ink type and same receiver media type but each of an ink drop size sufficient to provide no gap in the center of the cluster.

20. A method of printing with an ink jet printer, comprising the steps of:
   providing an inkjet print head having an array of nozzles, each nozzle being capable of selectively producing when actuated an ink drop; and
   printing, in response to a signal calling for a maximum density value at a respective pixel location, a larger ink dot at the respective pixel location on a reference raster and a smaller ink dot at a pixel location adjacent to the respective pixel location but on a shifted raster and wherein the larger and smaller ink dots are of a respective size such that for a 2×2 set or cluster of adjacent ink dots each of the larger ink dot size and each on the adjacent pixel locations of the reference raster a gap is left in the center of the cluster, and the smaller ink dot on the shifted raster in the center of the 2×2 set of adjacent larger ink dots is of a size to cover the gap.

21. The method of claim 20 and wherein the larger dot on the reference raster is formed by multiple passes of the print head wherein an ink drop is deposited at the pixel location on each of plural passes.

22. The method of claim 21 and wherein the smaller dot on the shifted raster is formed by multiple passes of the print head wherein an ink drop is deposited on the shifted raster on each of plural passes.

23. The method of claim 20 and wherein the larger dot on the reference raster is formed in one set of plural passes of the print head wherein an ink drop is deposited at the pixel location during each of the plural passes of the one set and only dots on the reference raster are printed during said one set of plural passes and the smaller dot is formed during a second set of plural passes of the print head pass during which second set of plural passes of the print head printing of dots only on the shifted raster occurs.

24. The method of claim 20 and wherein the larger dot on the reference raster is formed in only a single pass of the print head wherein a larger ink drop is deposited at the pixel location during the single pass during which pass only dots on the reference raster are printed and the smaller dot is formed by a smaller ink drop deposited during only another single pass of the print head during which another single pass of the print head printing of dots only on the the shifted raster occurs.

25. The method according to claim 10 and wherein ink drops deposited on the reference raster are printed during a pass of the print head over the receiver and only ink drops on the reference raster are printed during said pass.

* * * * *